Nov. 28, 1967   W. G. PETERSON ET AL   3,354,558
TEACHING AND SELF-TEACHING DEVICE
Filed Jan. 25, 1965
FIG. 1
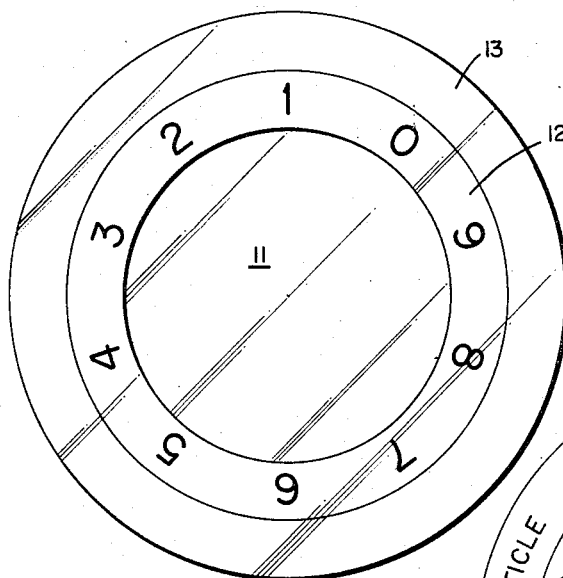
Adj. polarizing discs held together by annular magnets
FIG. 2
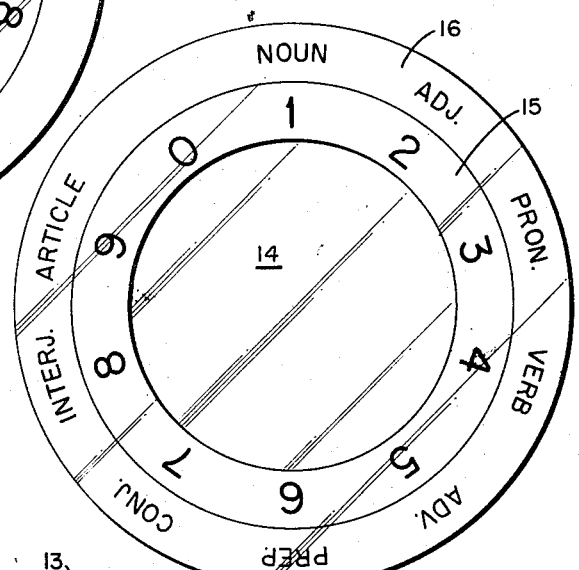
FIG. 3
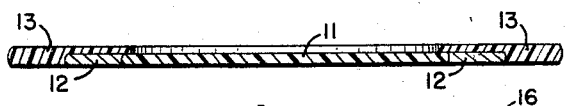
FIG. 4
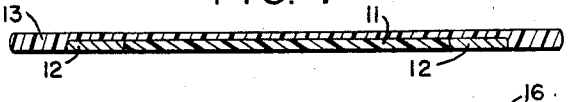
FIG. 5
FIG. 6
FIG. 7
FIG. 8
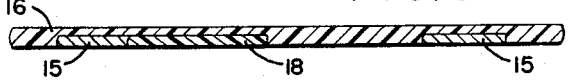

3,354,558
TEACHING AND SELF-TEACHING DEVICE
Walter G. Peterson and Bernice E. Peterson, Eugene, Oreg., assignors to Polarknown, Incorporated, Eugene, Oreg.
Filed Jan. 25, 1965, Ser. No. 427,747
5 Claims. (Cl. 35—9)

This invention relates to teaching apparatus and more particularily to using polarizing lenses.

It is an object of the present invention to provide an easier way to learn parts of speech on a written page.

Another object of the present invention is to provide for teaching mathematics in younger grade level.

Still another object of the present invention is to provide a simple way of showing 9 answers for parts of speech, or 10 answers for mathematics, by using two polarizing lenses in conjunction with a hole punched in a written or typed page.

For other objects and for a better understanding of the invention, reference may be had to the following detailed description taken in conjunction with the accompanying drawings in which:

FIGURE 1 is a top plan view of a disc to be used underneath a printed page.

FIGURE 2 is a top plan view of a disc made in accordance with the present invention and to be used on top of a printed page.

FIGURE 3 is a cross section view of the FIGURE 1 disc using an open window for light to come through lens 11.

FIGURE 4 is cross section view similar to FIGURE 3 but having full clear plastic 13 to hold polarizing lens 11 and thin permanent magnet 12 together.

FIGURE 5 is a side elevation view of FIGURE 2 and using open window for light to come through lens 14.

FIGURE 6 is the cross section of FIGURE 2 but with the variation of having full clear plastic covering for holding polarizing lens 14 and thin soft iron washer together.

FIGURE 7 is similar to FIGURE 4 but using a half moon shaped lens 17 rather than a full lens.

FIGURE 8 is similar to FIGURE 6 but using a half moon shaped lens 18.

Referring now more in detail to the drawing, FIGURE 2 being made of a polarizing plastic lens surrounded by a thin iron washer 15 and being held together by clear plastic 16 the size of a nickel coin, with numerals 0 to 9 inclusive, printed on plastic 16 on top of iron washer, and surrounding numerals in clockwise order and equally spaced;

Noun _____ 1
Adj. _____ 2
Pron. _____ 3
Verb _____ 4
Adv. _____ 5
Prep. _____ 6
Conj. _____ 7
Interj. _____ 8
Article _____ 9

The polarizing lens is set in predetermined relation with numerals so they will always be in the same relation to the axis and will correspond with lens 11 FIGURE 1.

FIGURE 1 being made of a polarizing lens, plastic or otherwise, 11 surrounded by a thin round flat permanent magnet 12 and held in place by clear plastic 13. The plastic above the magnet is printed with numerals 0 to 9 inclusive in counterclockwise order and set in predetermined relation to axis so as to correspond to lens 14 FIGURE 2. This is to be placed under the written page and under the punched hole that is above the part of speech.

In actual use the disc of FIGURE 1 is fastened securely under a printed or written page and underneath a punched hole that is above the part of speech being careful to rotate it so the correct numeral is facing the top edge of the printed page before it is fastened securely. It is fastened with some material such as transparent tape or other suitable material so it can be left in permanent position or can be taken off and reused on another written page.

Then if the disc of FIGURE 2 is placed on top of the printed or written page and rotated so the correct numeral is facing the top edge of the page, the polarizing lenses will show a violet of blue color, or whatever color of polarizing material is being used. This gives correct answer when held up so light can show through, the light coming through from under the page from some light source.

The disc with the magnet of FIGURE 1 is always fastened underneath the printed page and the disc of FIGURE 2 containing the iron washer is held in place by the magnet.

In use the pupil will find that in rotating the disc 360 degrees, that it will show two blue color positions, one being the correct answer and the other a wrong one.

In the embodiment of FIGURE 7 and FIGURE 8 these half moon lenses will show only one blue color for the 360 degrees rotation and this will be the correct answer. These half moon lenses would require full plastic overlay such as FIGURE 4 and FIGURE 6. Otherwise the pupil could match the one on top with the half moon lens underneath by pure mechanics and not learn thereby. The other half across from the half moon lens could be tinted to appear the same as the lens.

Clear tape can be used as well to hold the parts together in FIGURE 4 and FIGURE 6 and opaque tape with the correct size hold can also be used, that is for full circle lens only.

What we claim as new and desire to protect by Letters Patent of the United States is:

1. A teaching device comprising in combination a printed or written page with holes punched above certain words, two polarizing lenses, one lens having a permanent magnet and placed under the page, and the other lens having a thin iron washer and placed on top of the page to be held in place by the magnet under the page.

2. The combination of two discs, each containing a series of numerals and a polarizing lens oriented so its polarity will be always in the same setting in regard to the numerals, one disc being fastened underneath a printed page, the other disc being used on top of the printed page and rotatable at will by a pupil, the lenses when correctly positioned being indicative of a correct answer.

3. The combination of claim 2, said lenses being circular.

4. The combination of claim 2, said lenses being of half moon shape.

5. The combination of claim 2, said numerals being arranged in a circle on each disc with the numerals on said one disc progressing in a counterclockwise order and the numerals on said other disc progressing in a clockwise order.

References Cited

UNITED STATES PATENTS

| | | | |
|---|---|---|---|
| 2,122,225 | 6/1938 | Wheelwright | 88—65 X |
| 2,157,798 | 5/1939 | Neuklis | 35—9 |
| 2,624,236 | 1/1953 | Kirkpatrick | 88—65 X |
| 3,010,228 | 11/1961 | Torre | 35—73 |
| 3,162,008 | 12/1964 | Berger | 58—126 |

EUGENE R. CAPOZIO, *Primary Examiner.*

H. S. SKOGQUIST, *Assistant Examiner.*